I. W. COLBURN.
MEANS FOR DRAWING SHEET GLASS.
APPLICATION FILED FEB. 12, 1908.

970,182.

Patented Sept. 13, 1910.
6 SHEETS—SHEET 1.

I. W. COLBURN.
MEANS FOR DRAWING SHEET GLASS.
APPLICATION FILED FEB. 12, 1908.

970,182.

Patented Sept. 13, 1910.
6 SHEETS—SHEET 4.

FIG. 12.

Witnesses

Inventor
By his Attorneys

I. W. COLBURN.
MEANS FOR DRAWING SHEET GLASS.
APPLICATION FILED FEB. 12, 1908.

970,182.

Patented Sept. 13, 1910.
6 SHEETS—SHEET 6.

FIG. 14

WITNESSES

INVENTOR

BY HIS ATTORNEYS

UNITED STATES PATENT OFFICE.

IRVING W. COLBURN, OF FRANKLIN, PENNSYLVANIA, ASSIGNOR TO COLBURN MACHINE GLASS COMPANY, OF FRANKLIN, PENNSYLVANIA, A CORPORATION OF NEW JERSEY.

MEANS FOR DRAWING SHEET-GLASS.

970,182.  Specification of Letters Patent.  Patented Sept. 13, 1910.

Application filed February 12, 1908. Serial No. 415,587.

*To all whom it may concern:*

Be it known that I, IRVING W. COLBURN, of Franklin, Pennsylvania, have invented a new and useful Improvement in Means for Drawing Sheet-Glass, which improvement is fully set forth in the following specification.

This invention relates to the art of drawing sheet glass from a mass of molten glass, and more particularly to a combination of mechanism designed to perform the drawing operation. It is well known in this art that when attempts are made to draw glass in sheet form from a mass of molten glass, there is a tendency on the part of the sheet being drawn to narrow or pull to a string or thread, and in a certain application for Letters-Patent of the United States for improvements in continuous sheet-glass drawing means, Serial No. 368,096, filed April 13th, 1907, I have shown a machine for drawing sheet-glass in which there is combined with the drawing mechanism means for overcoming the narrowing tendency of the sheet and acting to maintain the drawn sheet of substantially uniform width. In certain Letters-Patent issued to myself solely and also in U. S. Patent 867,948, issued Oct. 15, 1907, to myself and Edgar Washburn as joint inventors, there are also shown means for drawing a sheet of glass, combined with means for maintaining the width of the sheet substantially uniform throughout the drawing operation. The continuous sheet-glass drawing means described and illustrated in said patents and in my application aforesaid afford efficient means for drawing a sheet of glass of substantially uniform width, and the present invention is designed to produce a still different means for the same purpose, and to this end it consists in the combination, with means for drawing a sheet of glass, of means for seizing the opposite edges of the sheet, and acting not only to overcome the narrowing tendency of the sheet during the drawing operation, but also to impart thereto a more or less lateral stretching effect. The means for drawing the sheet of glass may be any suitable means for this purpose. The means chosen for illustration herein, is the glass-drawing-means shown in my application aforesaid, to wit, a receptacle containing molten glass with skimming or rib-annihilating rolls revolving with their lower peripheries immersed in the mass of molten glass, and a drawing chamber having a carrier and suitable grip bars for engaging the sheet and drawing it upward over a bending roll, whereby the sheet is turned from a vertical to a horizontal position. While such drawing means constitute an efficient form of drawing means, the present invention is not limited to such specific form of drawing mechanism, since any suitable drawing mechanism would be within the scope of the present invention.

The width-maintaining and sheet-stretching means of the present invention consist of two sets or pairs of co-acting rolls, which are located on opposite sides of the drawing mechanism proper and slightly above the point where the sheet being drawn emerges from the mass of molten glass. In each pair of rolls, the terminal portion of the rolls is screw-threaded, the two rolls constituting the pair, however, having screw-threads running in reverse directions, that is, one is a right-hand and the other is a left-hand screw-thread, and as the sheet is being drawn, the edge portions of the sheet are seized between the screw-threaded rolls, which rolls are revolved with their inner or adjacent surfaces moving upward and outward. For convenience of operation, the rolls are slightly tapering or conical in form, though this is not essential. I have discovered that unless these screw-threaded rolls are driven at a peripheral speed exceeding that of the upward or linear movement of the sheet, they will not act to maintain the width of the sheet, nor will they have any stretching effect thereon. I have therefore provided driving means for said rolls capable of being so adjusted that the rolls will have imparted thereto a peripheral speed exceeding that of the upward or longitudinal movement of the sheet being drawn. By this means I am enabled not only to entirely overcome the narrowing tendency of the sheet, but to slightly stretch the same during the drawing operation. In addition to the width-maintaining and stretching action which the rolls have upon the sheet, they also assist in drawing the sheet of glass. If the rolls became heated to a sufficient degree, the plastic glass would adhere thereto and thus defeat the very object of their employment. Their proximity to the molten glass from which the sheet is drawn, and their contact with the hot sheet would inevitably heat the rolls to the degree where the glass would stick to the rolls, and to avoid this the invention includes cooling means for the rolls.

The invention further consists in a pair of approximately positioned, horizontally-rotated, revoluble, coöperating screw-threaded rolls, which act to stretch the sheet during the drawing operation, combined with means for drawing the sheet as a whole, and also with automatic means for limiting the extent of the stretching action exerted by the rolls upon the sheet. As herein shown, said limiting means consist of milled or knurled surfaces on the rolls adjacent to the screw-threaded sections or portions of the rolls but exterior thereto. In another form, the means for limiting the stretching action of the rolls upon the sheet consists of screw-threads upon the rolls, which screw-threads on each roll are reversely inclined from the stretching or holding threads upon the same roll.

The inventive idea involved in my invention is capable of receiving a variety of mechanical expressions, and for the purpose of illustrating the invention, I have shown in the accompanying drawings certain embodiments of the invention, which embodiments, however, are to be taken as illustrative only and not as designed to indicate the scope of the invention, reference being had to the claims herein for that purpose.

Referring to the drawings, in which like reference numerals indicate like parts throughout the several views, 1, 2, indicate two rolls here shown as slightly tapering or conical in form, each mounted upon the extremity of tubular shafts 3, 4, which shafts pass revolubly through the respective bearings 5, 6, mounted upon a suitable base 7. The bearing 5 may be, and preferably is, rigidly mounted upon the base, while the bearing 6 is so mounted as to be capable of a horizontally rotative movement. Shaft 3 is adapted to be revolved by means of beveled gears 8 and 9, the gear 8 receiving driving motion through the shaft 8', in a manner hereinafter described. Motion is transmitted through shaft 3 to shaft 4 by means of intermeshing spur gears 10 and 11. Each of the shafts 3 and 4 is provided at its outer end portion with a stuffing box 12 through which passes the pipe 13, by means of which water or other cooling fluid is conducted to the interior of the rolls. The pipes 13 terminate within the rolls which are made hollow for that purpose, and the cooling fluid returns by way of the space between the exterior diameter of the pipe 13 and the interior of the hollow shaft 3 or 4, as the case may be, the outer ends of the pipes 13 being connected to a suitable source of supply, and the space between the pipes 13 and the shafts 3, 4, being connected with a suitable discharge conduit, in a manner which will be well understood. Rigidly connected to the bearing 6 is an outwardly extending arm 15 which is connected to a spring connection 14 at one end, the other end of which is attached to any suitably firm object, such as a structural detail 15' or a part of the wall of the furnace or working chamber.

Figures 1, 2, 3, 4:
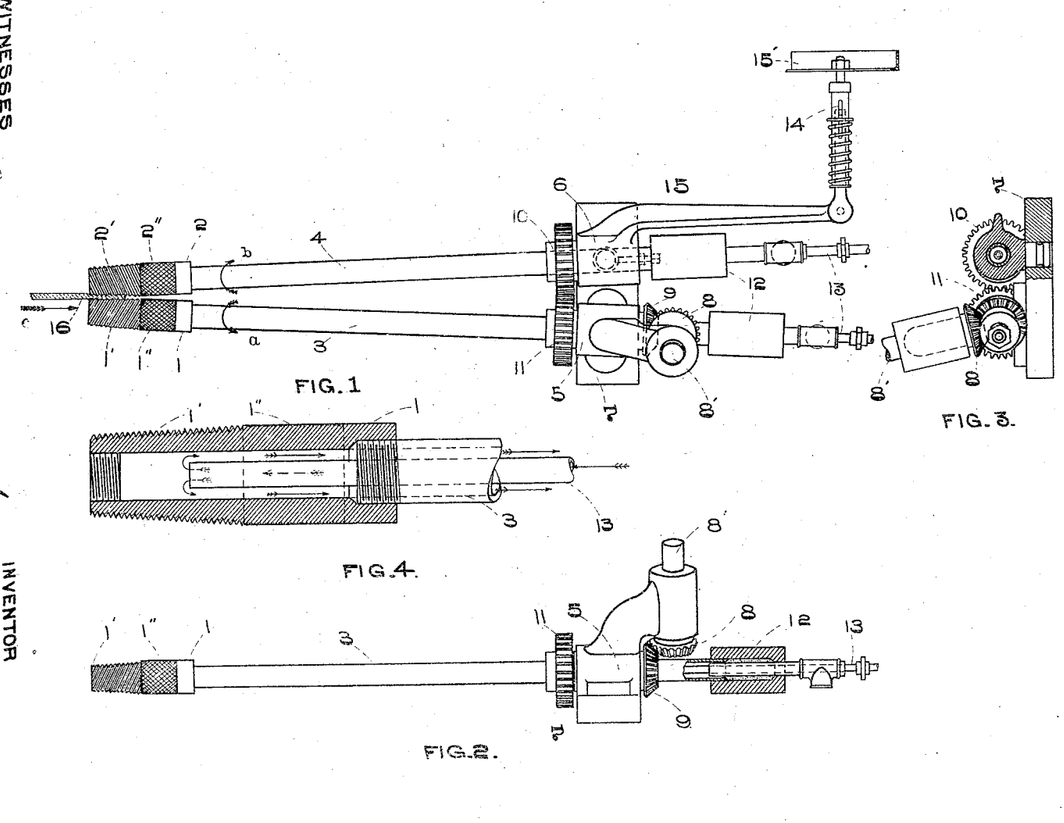
Figure 1 is a top plan view of my width-maintaining and stretching means, together with the shafting, gearing, etc., coöperating therewith to drive the same.
Fig. 2 is a side elevation of Fig. 1, parts being broken away.
Fig. 3 is an end elevation of Fig. 1, with parts shown in section.
Fig. 4 is a broken sectional detail on a large scale of the drawing roll and connected driving shaft.
Figure 5:
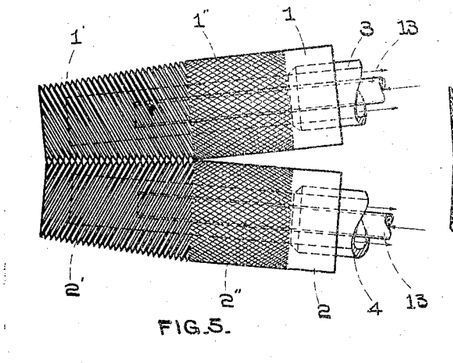
Figs. 5, 6, 7, 8, 9 and 10 are top plan views of some of the forms which the inventive idea embodied in the rolls may assume.
Figure 14:
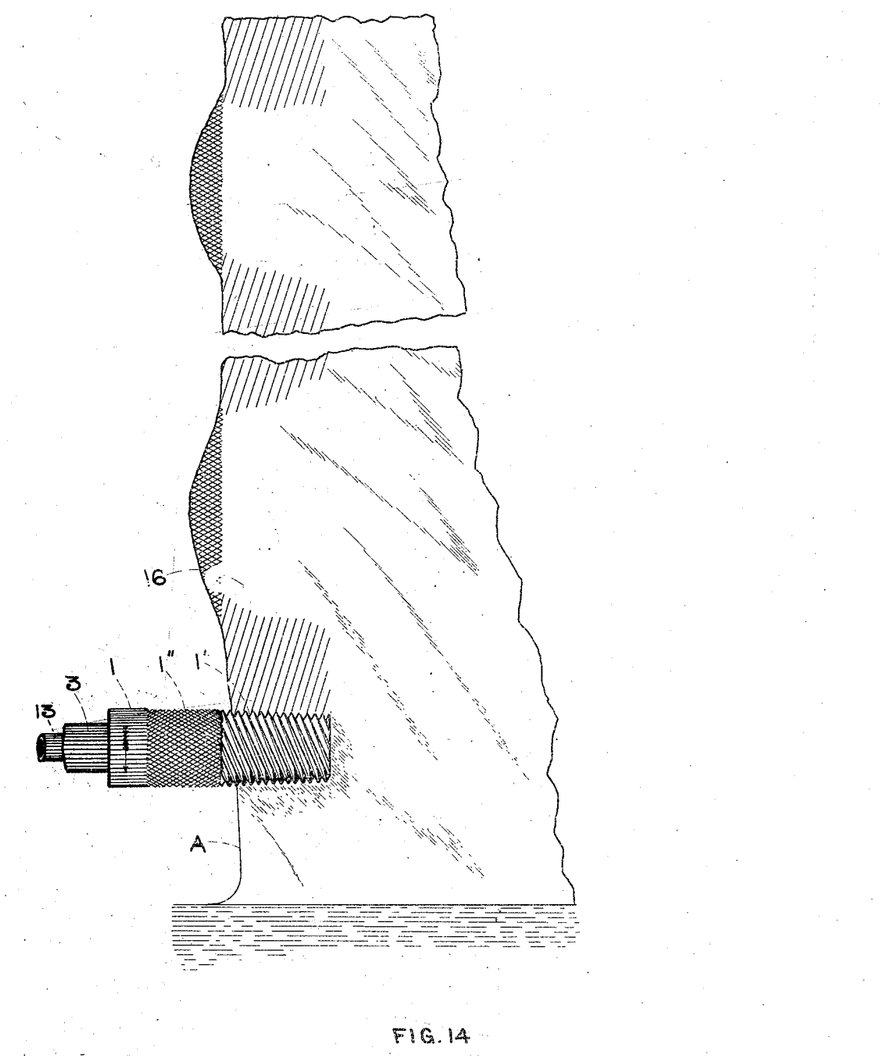
Fig. 14 is a broken front elevation illustrating the action of the rolls upon the sheet of glass.

The rolls 1, 2, are each screw-threaded at their free ends, the roll 1 having a left-hand screw-thread 1' and the roll 2 a right-hand thread 2', so that when said terminals revolve in the direction indicated by the arrows a, b, Fig. 1, respectively, the lead or travel of said threads is away from the free ends of the rolls, that is, in the direction indicated by the arrow c, Fig. 1. As before stated, the revolving motion imparted to said rolls is such that their peripheral speed is greater than the speed of the upward or linear travel of the sheet of glass 16 (see Figs. 12 and 14), the edges of which are being acted upon by said rolls. The result of this relative differential speed of travel will be hereinafter more fully explained. Still referring to Fig. 1, each of the rolls 1, 2, has thereon adjacent to the screw-threaded portions 1', 2', a milled or knurled portion 1'', 2''.

Figure 12:
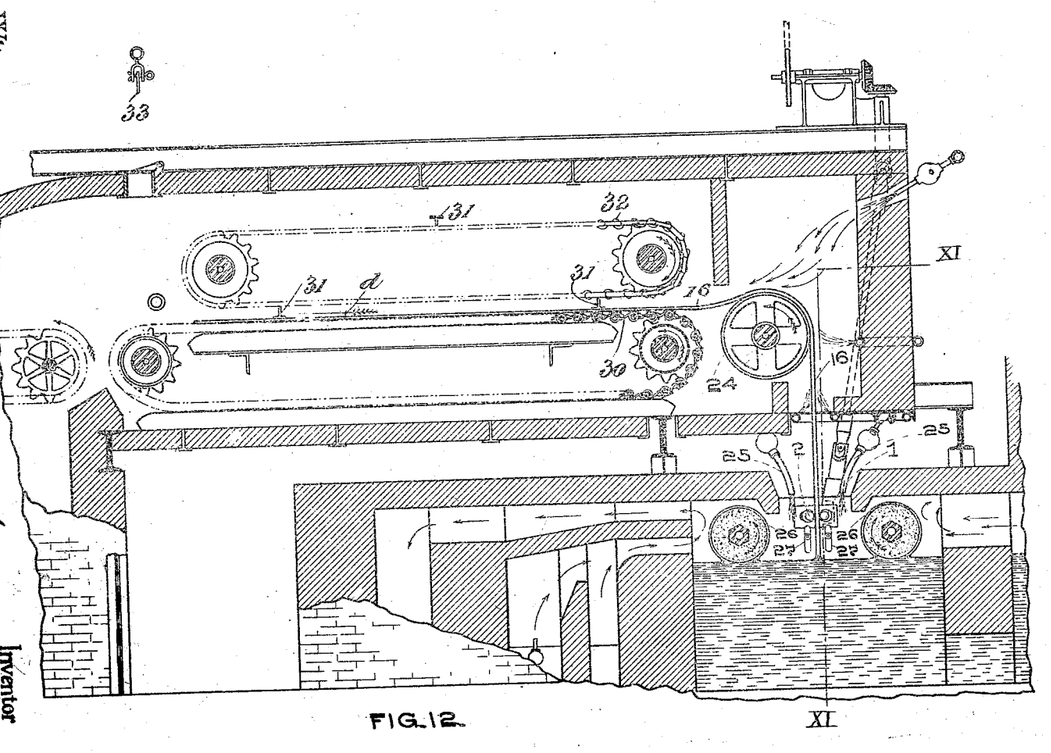
Fig. 12 is a central, vertical, longitudinal section on the line XII—XII, Fig. 11, showing the forward or drawing chamber end of my improved continuous sheet-drawing machine.

Referring to Fig. 12, the drawing apparatus here shown is substantially that described in detail in my aforesaid application, and consists, generally speaking, of an endless carrier 30 coöperating with grip bars 31, carried on endless chains 32, the carrier 30 and the chains 32 moving in the direction indicated by the arrow d, and the parts being so positioned that the grip bars 31 act to grip the sheet 16 between said bars and the endless carrier 30. The sheet may be started in any suitable way, as by the introduction of a bait 33, in the manner fully set forth in my aforesaid application. The sheet is drawn from a mass of molten glass lying between two skimming or rib-annihilating rolls 26, upward between a pair of shields 27 and over a bending roll 24, suitable means in the form of burners 25, 25, being employed to regulate the temperature of the glass during the drawing operation.

Figure 11:
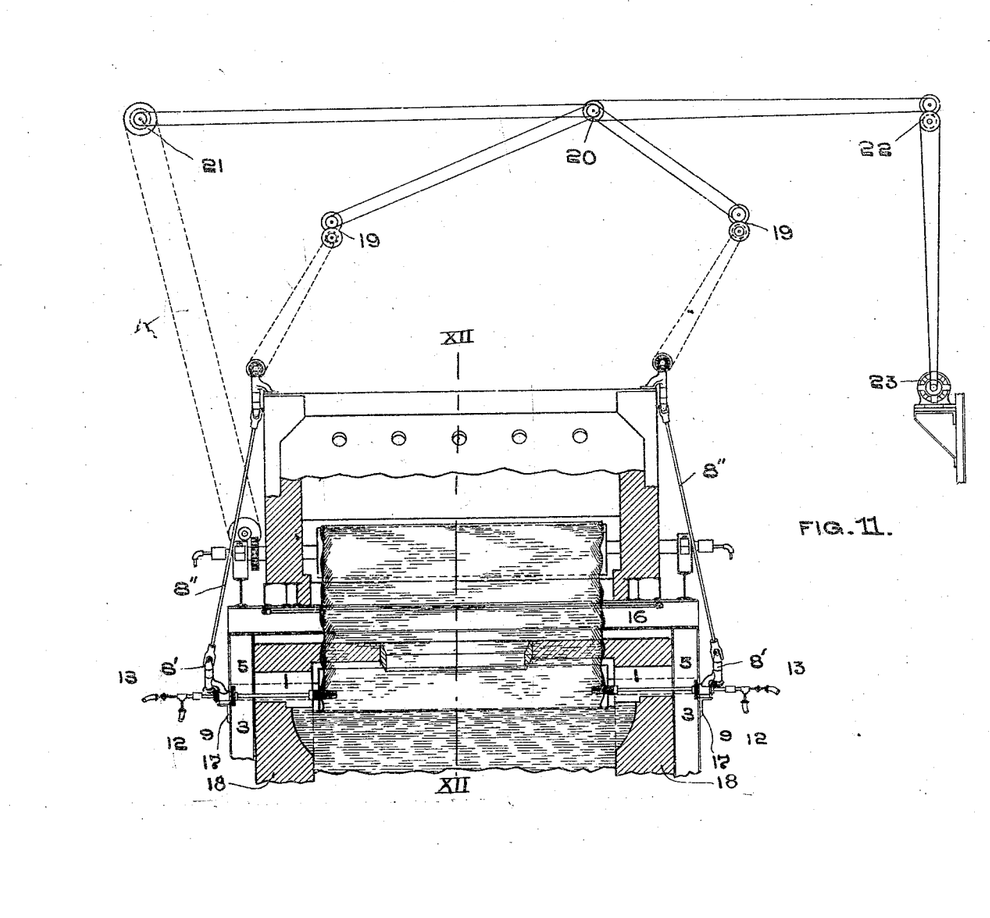
Fig. 11 is a vertical section on the line XI—XI, Fig. 12, showing the width-maintaining and stretching rolls in position on the machine and the driving mechanism for said rolls and for the sheet-drawing devices.

My improved width-holding device is applied to and combined with the above-described continuous sheet-glass drawing mechanism in the following manner: Suitable supports, as brackets 17, 17, Fig. 11, are provided on each side of the working chamber 18, and to each of said supports the base 7 of one of the width-maintaining devices is attached, with the shafts 3, 4, extending horizontally inward, and the rolls 1, 2, so positioned as to adapt them to coöperatively engage the edge portion of the sheet of glass. Said rolls are preferably positioned at a right angle or perpendicular to the travel of the sheet of glass. Motion is communicated to the shaft 8' and the holding device through shafts 8'', one on each side of the machine (Fig. 11), which shafts 8'' are independently driven through separate individual variable speed pulleys 19, 19, motion being in turn transmitted to said pulleys from jack-shaft 20, from which shaft 20 motion is also transmitted to the drawing mechanism proper through shaft 21. Jack shaft 20 is operated by means of the variable speed pulley 22 which receives motion from any suitable source of power, here shown as an electric motor 23.

It will be readily understood that by the above arrangement of power transmission, the speed of the machine as a whole may be varied at pulley 22 and the speed of the width-holding devices may be individually varied each by means of its pulley 19, and thus the harmonious action of the drawing and the width-holding elements is duly provided for.

The operation is as follows: The operation of drawing the sheet is started in the usual or any suitable manner, as by means of the bait 33, which is inserted into the molten glass, then drawn upward and passed over the bending roll 24, after the manner set forth in my aforesaid application. If the bait is not sufficiently long to start a sheet of glass wide enough for its edges to be received between the two sets of rolls 1, 2, on the opposite sides of the machine, the edges of the newly formed sheet are seized by means of hand-hooks and stretched laterally until it is sufficiently wide to be engaged at both edges by the screw-threaded rolls. For the purpose of so receiving the edge portions of the sheet, the terminal 2 is moved outwardly or away from terminal 1 by turning its shaft 4 upon the bearing 6, against the tension of the spring connection 14, and after the edge of the sheet of glass is introduced between the rolls, the terminal 2 is permitted to again approach terminal 1, and the spring connection 14 acts to yieldingly hold said terminal 2 in working position. When the edges of the outwardly moving sheet of glass are thus positively received between the rolls, the peripheral speed of said rolls is so regulated by means of the variable speed pulleys 19 that the said peripheral speed shall exceed the speed with which the sheet of glass is traveling upward, and by reason of this differential rate of speed the action of the threads 1', 2', upon the surface of the sheet of glass tends to draw said edges farther outward, that is, farther and farther between the rolls in the direction indicated by the arrow c, Fig. 1, and thereby a lateral stretching action is continually exerted upon the sheet. This action would cause the edge of the sheet of glass to be carried farther and farther between the holding rolls if no provision were made to prevent it, provided the rolls were over-speeded, that is, provided that they were driven at a speed greater than precisely the speed required to overcome the narrowing tendency of the sheet. It is for the purpose of limiting this outward travel of the edges of the sheet of glass between the rolls that the milled sections 1'', 2'', are provided upon each roll. As the edge of the sheet of glass passes in between said milled sections, the rolls 1, 2, are thrown sufficiently apart so that the action of the screw-thread is greatly or wholly reduced (see Fig. 17), and the natural tendency of the glass to narrow down is asserted, and the edge of the glass recedes to a position between the threads 1', 2'. It will be seen, therefore, that during the drawing operation the immediate edge of the sheet of glass is repeatedly entering between and receding from said milled sections, and this gives to the edge of the sheet the appearance shown in Figs. 11 and 14, which is somewhat exaggerated for the purpose of clear illustration.

From the above description, it will be readily understood that the action of the rolls 1, 2, aside from overcoming the narrowing tendency of the sheet, would be such as to have a stretching action upon the sheet, and also to materially assist the drawing mechanism in causing the upward or drawing movement of the sheet of glass.

Figure 13:
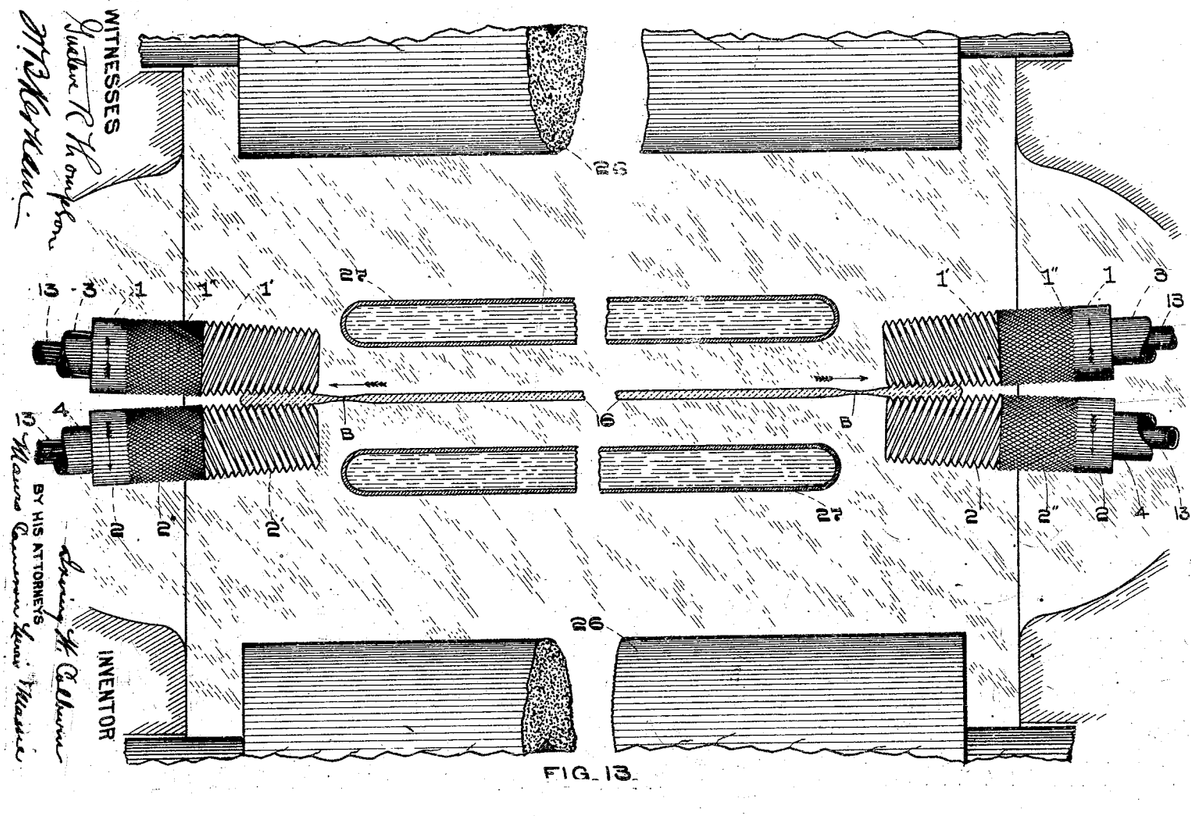
Fig. 13 is an enlarged broken top plan view showing the width-maintaining and side-stretching rolls in position, and illustrating their action upon the sheet of glass during the drawing operation.

An examination of the sheet of glass drawn with the aid of this improved width-holding and stretching device discloses a sectional form such as that shown in Fig.

13, wherein it will be noted that the edge portion is comparatively thick throughout the area where it is acted upon by the threaded roll; that said thickness is considerably reduced just inside of said area; and beyond such reduced area the sheet assumes a normal thickness which is maintained substantially uniform throughout the body of the sheet.

Below the rolls 1, 2, the edge of the forming sheet assumes the line A (see Fig. 14), which clearly exhibits the characteristic tendency of the sheet to narrow down when pulled into sheet form, and also discloses the stretching or lateral pulling action of the rolls 1, 2, thereon, whereby the width of the sheet is maintained.

There are several modifying influences which combine to produce the precise sectional form of sheet shown in Fig. 13, which influences are as follows: It will be readily understood that sheet 16 being, at the point where it is operated upon by rolls 1 and 2, in close proximity to the molten mass from which it is drawn, is in a very pliable and plastic condition, and particularly susceptible to the influences of heat or to a rise or fall in temperature. Aside from the heat which is generated in that portion of the working chamber approximate to the sheet of glass by the burners 25, 25, Fig. 12, large additional volumes of heat are radiated from the skimming or rib-annihilating rolls 26, 26. In order to shield the newly formed sheet from the action of said radiated heat, the water shields 27, 27, are interposed between the sheet and said rolls. Where sheet 16 is thus shielded and the temperature thereby regulated, the thickness of the sheet is uniform. There is, however, a small area of the sheet approximate to each edge which is not thus shielded, and is therefore subject to the direct action of said radiated heat, and yields more readily than other portions of the sheet to the stretching action of the width-holding rolls 1, 2, and thus causes reduced area B approximate to either edge portion of the sheet. The action of the heat from burners 25 and the object of providing the same are clearly set forth in Patent 836,439, before mentioned, as also the function of the skimming or rib-annihilating rolls 26 and the shields 27, and hence need not be more specifically recited herein.

Figure 6:
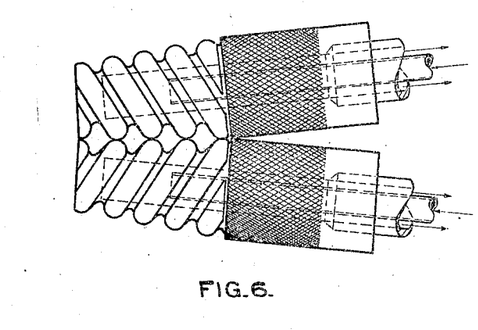
Figure 7:
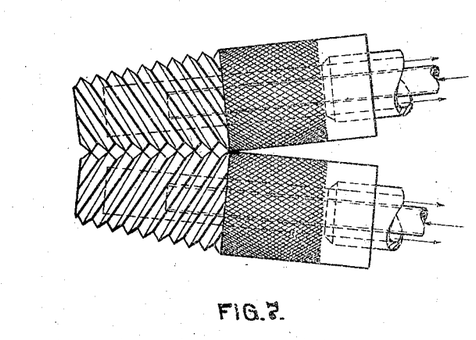
Figure 8:
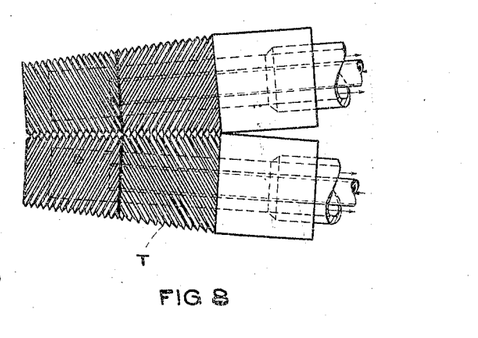
Figure 9:
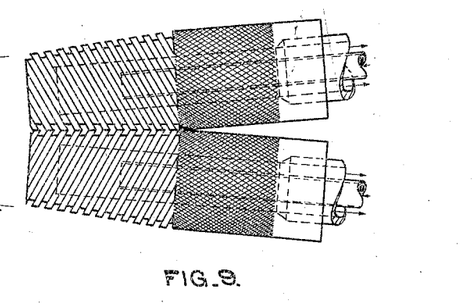
Figure 10:
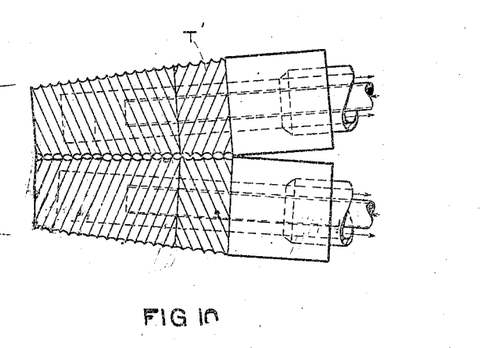

In the forms of rolls shown in Figs. 6, 7, 8, 9 and 10, the rolls of Figs. 6, 7 and 9 differ only in the form or pitch of the holding or stretching threads. In Figs. 8 and 10, instead of the milled or knurled surface 1″, 2″, there are shown releasing or arresting threads T, T′, which threads have an opposite lead or travel from the holding thread on the same roll.

With the milled or knurled form of roll such as shown in Figs. 5, 6, 7 and 9, the discontinuance of the stretching action of the rolls upon the sheet is due largely to the narrowing tendency of the sheet which is constantly present during the drawing operation, and to the slight opening or spreading of the rolls apart when the thicker edge of the sheet passes between the knurled portions. With the rolls shown in Figs. 8 and 10, however, having threads T, T′, of reverse lead, the said reverse threads act positively to throw the edge of the sheet inward. With this form of rolls, the sheet is constantly being thrown outward toward the reverse threads T, T′, and by them constantly thrown inward toward the threads 1′, 2′.

It will be readily understood by those skilled in the art that various changes in form and the proportion and relation of parts may be made without departing from the spirit of my invention, and all such changes are designed to be covered and included by my claims herein.

What is claimed is:—

1. In sheet-glass drawing apparatus, the combination of sheet-drawing mechanism, with width-maintaining and sheet-stretching means, and devices limiting the stretching action of said means.

2. In sheet-glass drawing apparatus, the combination of sheet-drawing mechanism, with two sets of revolubly mounted screw-threaded rolls, the rolls of each set having the one a right and the other a left screw-thread, and means imparting a peripheral speed to said rolls in excess of the lineal speed imparted to the sheet of glass by the drawing mechanism.

3. In sheet-glass drawing apparatus, the combination of sheet-drawing mechanism, with two sets of juxtaposed, horizontally related, oppositely-screw-threaded revoluble rolls, means yieldably holding the two rolls of each set in juxtaposition, means driving said drawing mechanism and said rolls, and means varying the speed of said rolls independent of the speed of said drawing mechanism.

4. In sheet-glass drawing apparatus, the combination of sheet-drawing mechanism, with a plurality of sets of width-maintaining devices engaging the opposite edge portions of the sheet, each of said sets comprising two coöperating screw-threaded rolls, and means driving said rolls at a peripheral speed exceeding the lineal speed of said drawing mechanism.

5. In sheet-glass drawing apparatus, the combination of sheet-drawing mechanism, with a plurality of sets of width-maintaining devices engaging the opposite edge portions of the sheet, each of said sets comprising a pair of coöperating rolls, and means driving said rolls at a peripheral speed exceeding the lineal speed of said drawing mechanism.

6. In sheet-glass drawing apparatus, the combination of sheet-drawing mechanism, with a plurality of sets of sheet-stretching devices engaging the opposite edge-portions of the sheet, and means limiting the stretching action of said devices.

7. In sheet-glass drawing apparatus, the combination of sheet-drawing mechanism, with width-maintaining means at each edge of the sheet acting in opposition to the narrowing tendency of the sheet, and devices intermittently relieving the sheet from the action of said means.

8. In sheet-glass drawing apparatus, the combination of sheet-drawing mechanism, with sheet-stretching means acting to broaden the sheet during the drawing operation, and devices acting to positively limit said broadening of the sheet within predetermined lines.

9. In sheet-glass drawing apparatus, the combination of sheet-drawing mechanism, with width-maintaining sheet-stretching drawing rolls acting on the edge portions of the sheet during the drawing operation, and means imparting a peripheral speed to said rolls exceeding the lineal speed of said drawing mechanism.

10. In sheet-glass drawing apparatus, the combination of sheet-drawing mechanism, with width-maintaining sheet-stretching screw-threaded drawing rolls acting on the edge portions of the sheet during the drawing operation, and means imparting a peripheral speed to said rolls exceeding the lineal speed of said drawing mechanism.

11. In sheet-glass drawing apparatus, the combination of sheet-drawing mechanism, with two sets of juxtaposed screw-threaded revoluble rolls one set yieldingly engaging each edge portion of the sheet of glass, variable-speed driving devices operably connected to said drawing mechanism, driving means connected to each set of rolls, and devices varying the speed of said rolls independently of each other and of the drawing mechanism.

12. In sheet-glass drawing apparatus, the combination of means drawing a sheet of glass from a molten supply, with two pairs of rolls engaging the respective edge portions of the sheet, means upon said rolls effecting a lateral stretching of the sheet, and means automatically limiting said stretching action.

13. In sheet-glass drawing apparatus, the combination of means drawing a sheet of glass from a molten supply, with two pairs of rolls engaging the respective edge portions of the sheet, means upon said rolls effecting a lateral stretching of the sheet, and means upon said rolls automatically limiting said stretching action.

14. In sheet-glass drawing apparatus, the combination of means drawing a sheet of glass from a molten supply, with two pairs of rolls, one pair engaging each edge portion of the sheet, and means on said rolls effecting the lateral stretching of the sheet when the peripheral speed of said rolls exceeds the lineal speed of travel of said sheet.

15. In sheet-glass drawing apparatus, the combination of means drawing a sheet of glass from a molten supply, with two pairs of rolls, one pair engaging each edge portion of the sheet, means on said rolls effecting the lateral stretching of the sheet when the peripheral speed of said rolls exceeds the lineal speed of travel of said sheet, and means automatically limiting said stretching action.

16. In sheet-glass drawing apparatus, the combination of means drawing a sheet of glass from a molten supply, with two pairs of rolls, one pair engaging each edge portion of the sheet, means on said rolls effecting the lateral stretching of the sheet when the peripheral speed of said rolls exceeds the lineal speed of travel of said sheet, and means on said rolls automatically limiting said stretching action.

17. In sheet-glass drawing apparatus, the combination of a receptacle containing a mass of molten glass, sheet-drawing mechanism drawing a sheet of glass from said molten mass, means applying heat to the surface of said molten mass during the drawing operation, means shielding the central portion or main body of the sheet from the direct action of said heat, and a pair of screw-threaded rolls engaging the two edge portions of the sheet, one roll of each pair having right screw-threads and the other roll having left screw-threads.

18. In sheet-glass drawing apparatus, the combination of a receptacle containing a mass of molten glass, sheet-drawing mechanism drawing a sheet of glass from said mass, means applying heat to the surface of said molten mass during the drawing operation, a pair of skimming rolls with their peripheries immersed in the surface of the molten mass, one on each side of the sheet, means shielding the central portion or main body of the sheet from the direct action of said heat, a pair of screw-threaded rolls engaging the two edge portions of the sheet, one roll of each pair having right screw-threads and the other roll having left screw-threads, means cooling said rolls, and means driving said rolls at a peripheral speed exceeding that of the longitudinal speed of the drawing mechanism.

19. In sheet-glass drawing apparatus, the combination of sheet-drawing mechanism, with two pairs of right and left screw-threaded rolls, one engaging each edge portion of the sheet during the drawing operation, means imparting a peripheral speed to said rolls in excess of the longitudinal speed of the drawing mechanism, and cooling means for said rolls.

20. In sheet-glass drawing apparatus, the combination of sheet-drawing mechanism with two pairs of right and left screw-threaded rolls, one engaging each edge portion of the sheet during the drawing operation, means imparting a peripheral speed of said rolls in excess of the longitudinal speed of said drawing mechanism, whereby the sheet is stretched as drawn, means on said rolls limiting said stretching action, and cooling means for said rolls.

In testimony whereof I have signed this specification in the presence of two subscribing witnesses.

IRVING W. COLBURN.

Witnesses:
 BESS LOUISE BLACK,
 WM. B. GRIFFEN.